(12) United States Patent
Phillips

(10) Patent No.: US 11,310,190 B2
(45) Date of Patent: Apr. 19, 2022

(54) NETWORK ANTI-TAMPERING SYSTEM

(71) Applicant: Ridgeback Network Defense, Inc., Baltimore, MD (US)

(72) Inventor: Thomas Sheppard Phillips, Finksburg, MD (US)

(73) Assignee: RIDGEBACK NETWORK DEFENSE, INC., Baltimore, MD (US)

( * ) Notice: Subject to any disclaimer, the term of this patent is extended or adjusted under 35 U.S.C. 154(b) by 0 days.

(21) Appl. No.: 16/212,270

(22) Filed: Dec. 6, 2018

(65) Prior Publication Data

US 2019/0312836 A1     Oct. 10, 2019

Related U.S. Application Data

(60) Provisional application No. 62/595,836, filed on Dec. 7, 2017.

(51) Int. Cl.
| | |
|---|---|
| *G06F 15/173* | (2006.01) |
| *H04L 61/103* | (2022.01) |
| *H04L 9/00* | (2022.01) |
| *H04L 101/622* | (2022.01) |
| *H04L 29/06* | (2006.01) |
| *G06F 9/455* | (2018.01) |

(52) U.S. Cl.
CPC ............ *H04L 61/103* (2013.01); *H04L 9/00* (2013.01); *H04L 61/6022* (2013.01); *H04L 63/0236* (2013.01); *H04L 63/101* (2013.01); *H04L 63/1466* (2013.01); *G06F 9/455* (2013.01); *H04L 63/1425* (2013.01)

(58) Field of Classification Search
CPC .......................... H04L 61/103; H04L 61/6022
See application file for complete search history.

(56) References Cited

U.S. PATENT DOCUMENTS

| | | | |
|---|---|---|---|
| 6,195,688 B1* | 2/2001 | Caldwell | H04L 29/06 709/208 |
| 7,562,390 B1* | 7/2009 | Kwan | H04L 63/0236 726/23 |
| 2004/0103314 A1* | 5/2004 | Liston | H04L 63/1491 726/23 |
| 2013/0132484 A1 | 5/2013 | Berezecki | |
| 2013/0339548 A1 | 12/2013 | Gopinath et al. | |

OTHER PUBLICATIONS

International Search Report and Written Opinion dated Feb. 4, 2019 in PCT/US18/64262.

* cited by examiner

*Primary Examiner* — Hua Fan
(74) *Attorney, Agent, or Firm* — Hogan Lovells US LLP

(57) ABSTRACT

A system and method detects or prevents tampering of computer networks by transmitting address messages indicating that unused network addresses are in use. The systems and method handles requests for network resources, such as Address Resolution Protocol (ARP) messages, and provides fabricated information to a potential attacker to disrupt an attack on an information system.

16 Claims, 4 Drawing Sheets

Example of ARP messages, request (430) and reply (440). The IP address 192.168.0.131 is not in use.

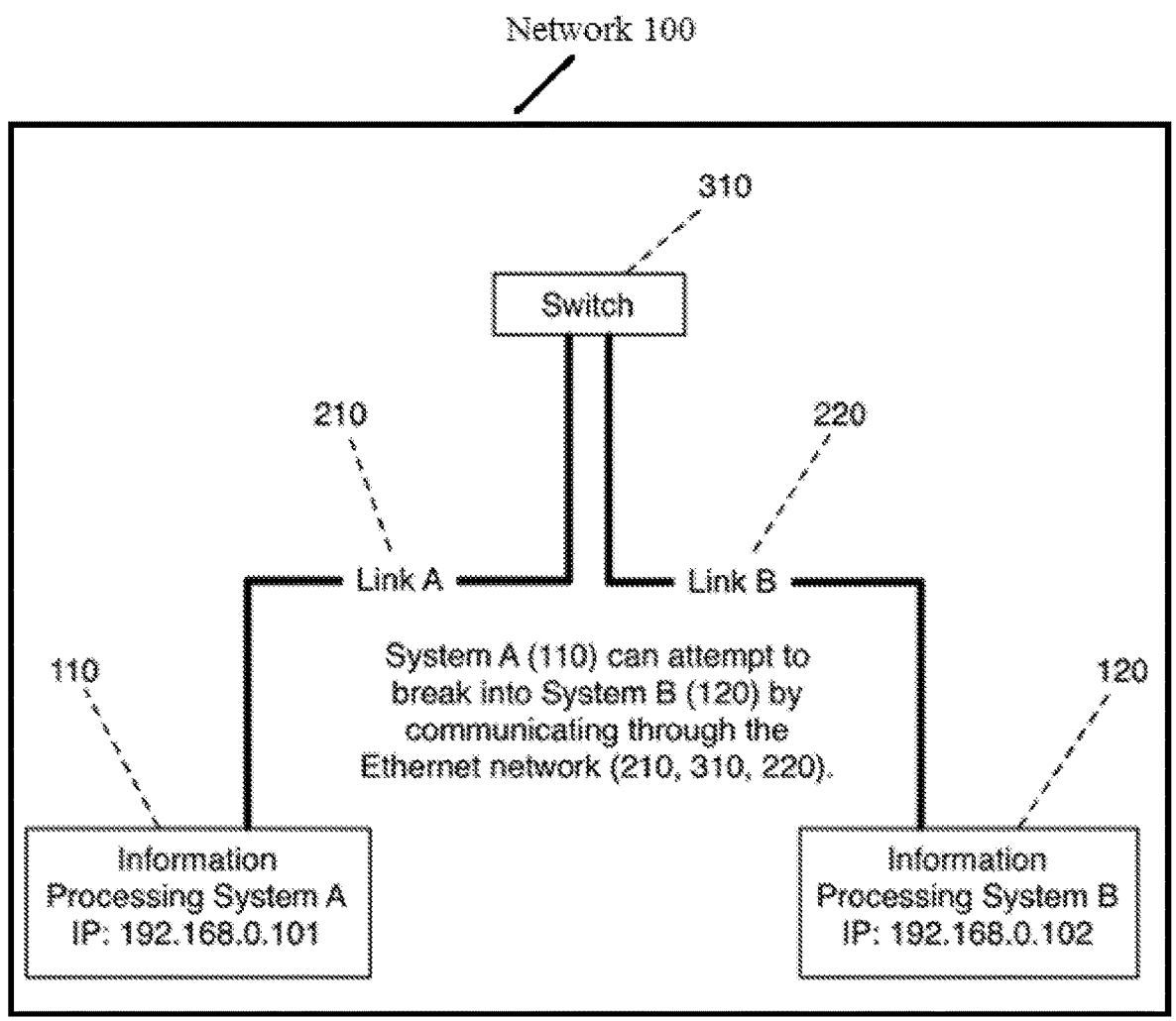
FIG. 1: Lateral movement.
(Prior Art)

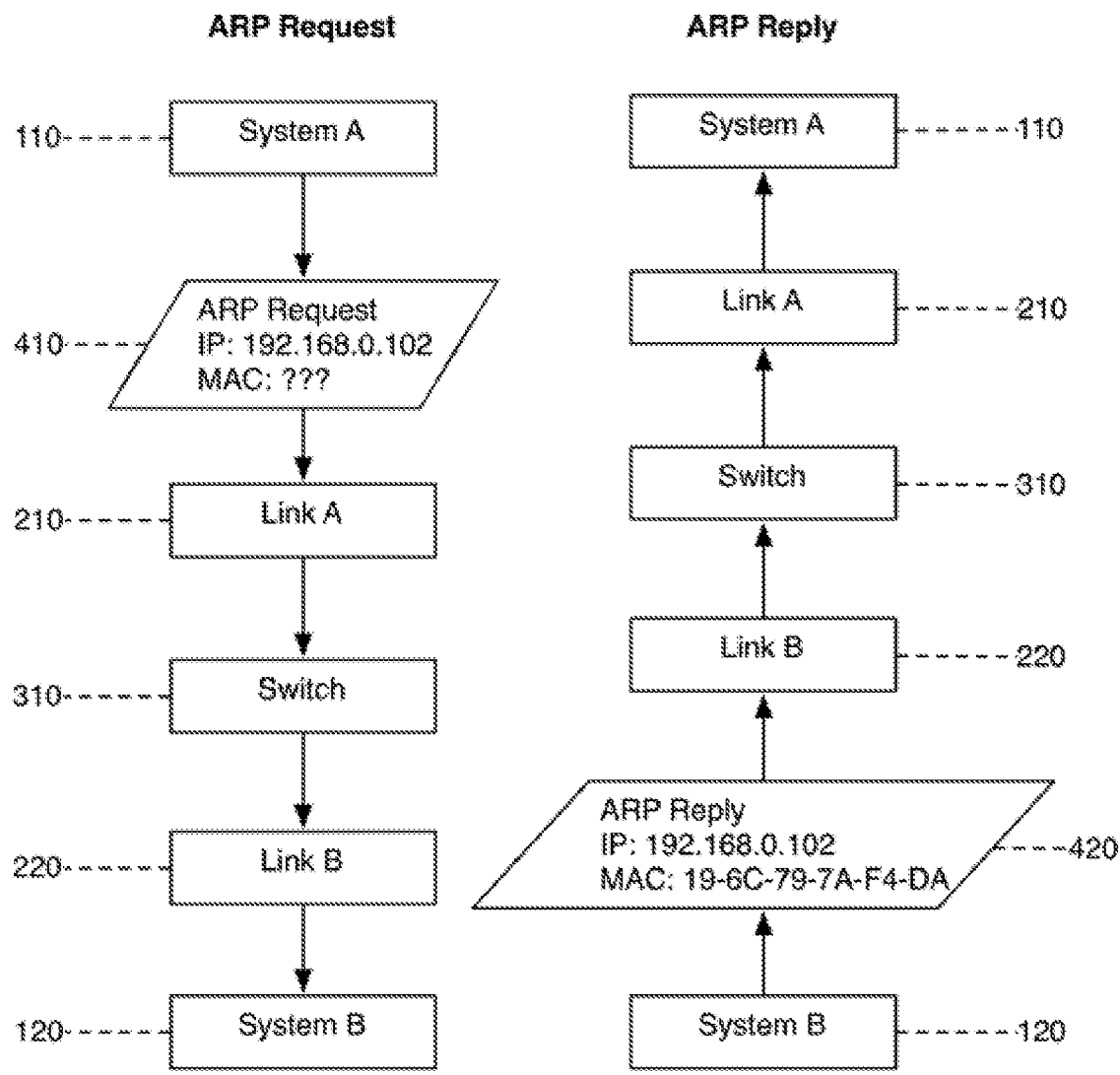
FIG. 2: Example of ARP messages, request (410) and reply (420).
(Prior Art)

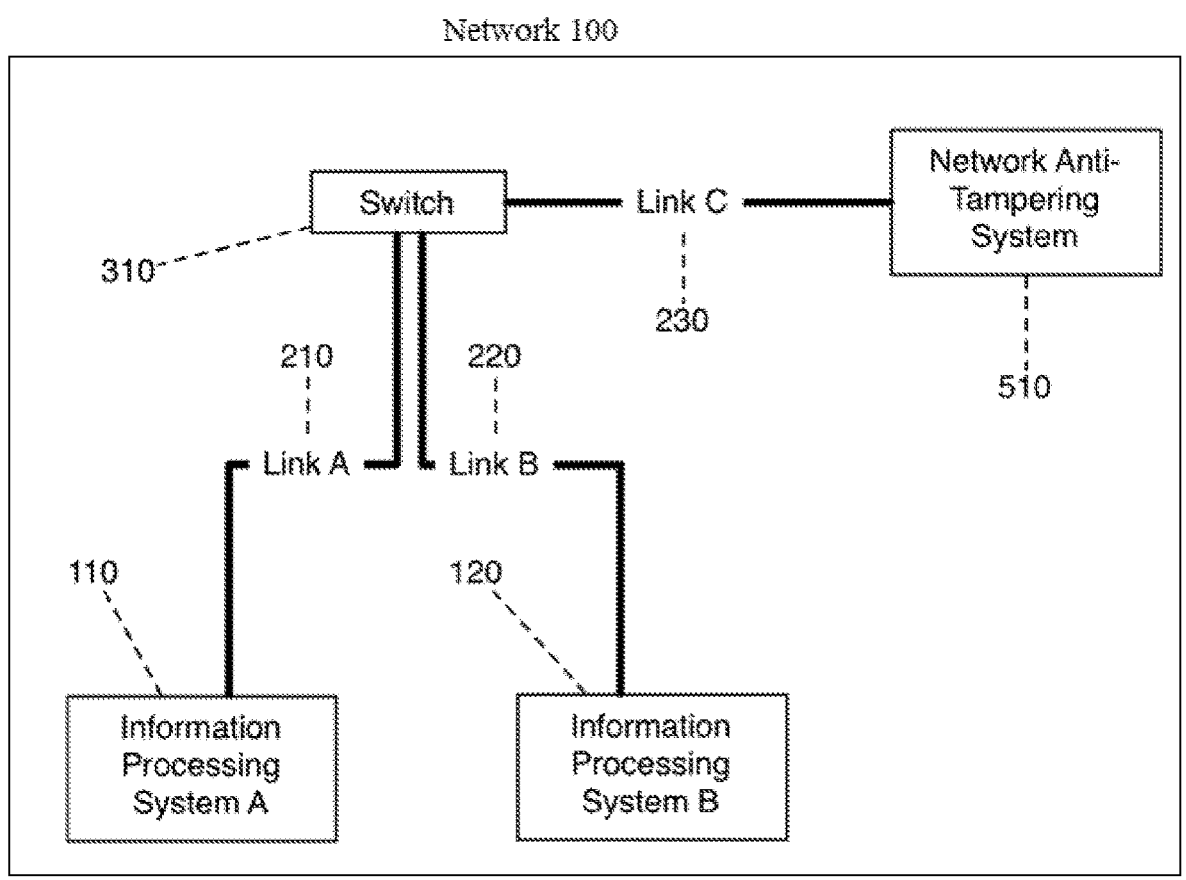
FIG. 3: Example of a network anti-tampering system attached to the network.

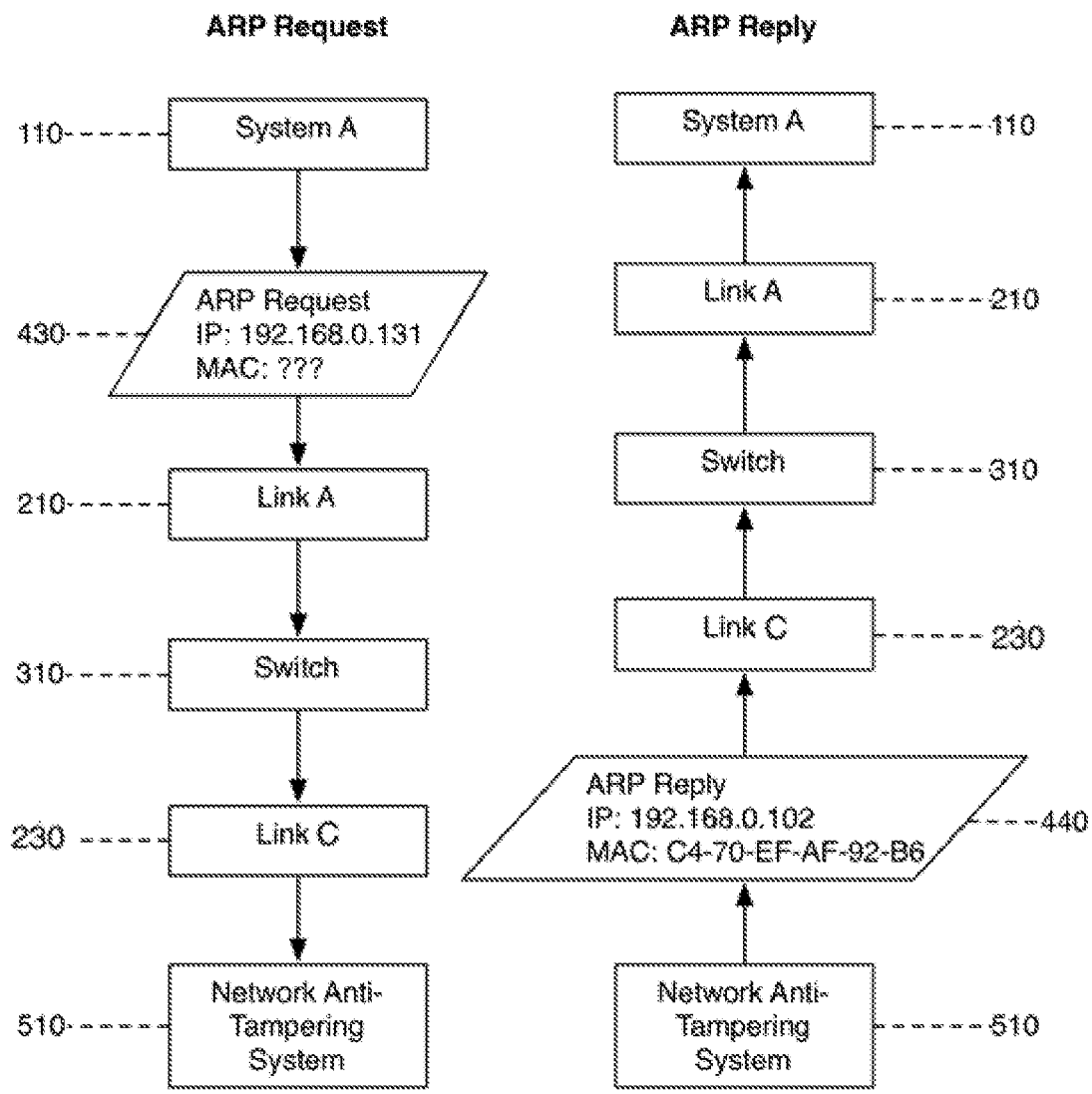
FIG. 4: Example of ARP messages, request (430) and reply (440). The IP address 192.168.0.131 is not in use.

NETWORK ANTI-TAMPERING SYSTEM

CROSS REFERENCE TO RELATED APPLICATIONS

The present application claims priority to U.S. Provisional Patent Application Ser. No. 62/595,836, filed Dec. 7, 2017, which is incorporated herein by reference in its entirety.

TECHNICAL FIELD

The present invention relates generally to information processing systems and methods, and more particularly to the preventing or discouraging of tampering with computer networks by unauthorized persons or computer programs. These unwanted intrusions into or tampering with computer networks are also referred to as, for example, hacking, cracking, breaking into, penetrating, breaching, exploiting, and compromising.

BACKGROUND OF THE INVENTION

Detecting and preventing the tampering with computer networks used by information processing systems can be extremely difficult. The complexity of modern information processing systems is such that there almost always exist any number of software flaws or unexpected combinations of input that would allow a malicious person or specially designed computer program to gain unauthorized access to an information processing system. Although various security mechanisms, such as password authentication or encryption, can be placed in front of an information processing system, it is almost always the case that either there exist methods to circumvent the security mechanisms or the security mechanisms themselves have exploitable flaws.

In order to combat this problem, it is necessary to be able to detect tampering and unwanted access to computer networks. Three methods are already in use to detect tampering include pattern recognition, signal detection, and virtual execution, though none of the three produce satisfactory results in the face of determined attackers. Pattern recognition is based on checking for the validity of the input data using finite state automata. Signal detection is based on checking for the validity of input data using statistical methods. Virtual execution is processing the input data in a facsimile environment and watching for unexpected outputs.

Pattern recognition, or pattern matching, is the detection of valid input by using a finite state automaton. Input data are compared to previously defined patterns. Matches between input data and patterns result in some action being taken, such as discarding the input data or sending an alert to a monitoring service. Pattern recognition is deficient as an anti-tampering method because it requires comparisons to be made to a necessarily finite set of predefined patterns. However, there are a practically infinite number of arrangements of malicious data that can evade a given finite number of patterns.

Signal detection is the detection of valid input by means of statistical methods. A person or program selects a set of statistical features to analyze in potential input data. Those selected features are then measured as input data arrives and features that exceed certain variances are marked as indicative of unacceptable input data. For example, a very weak radio signal (i.e., one of low amplitude) may be seen as an unacceptable signal, while a very strong radio signal (i.e., one of high amplitude) may be seen as an acceptable signal. Signal detection is deficient as an anti-tampering method because classifiers operate according to receiver operating characteristic (ROC) curves, which always require an engineering tradeoff between false positives (i.e., false alarms) and false negatives (i.e., unacceptable or unwanted data).

Virtual execution, sometimes called sandboxing, is the processing of input in a safe, facsimile environment and watching for unexpected outputs. Malicious computer programs are sometimes encrypted or delivered by seemingly non-malicious loader programs. These methods of delivery can be used to evade pattern matching systems. In a virtual execution process, any potentially malicious computer program is isolated in an ephemeral virtual execution environment. The program is then run and the environment is monitored for exceptional conditions such as the deletion of files or privilege escalation. These exceptional conditions can be indicative of the presence of an undesirable computer program, which may then be subsequently rejected. Virtual execution is deficient as an anti-tampering method because malicious data and programs can be camouflaged to evade detection as being executable, or can be engineered to manipulate the virtual execution environment in ways that prevent the production of exceptional conditions, for example, by detecting that they are being executed in a virtual environment and altering their behavior.

One problem with all three of the common tamper-detection methods—pattern recognition, signal detection, and virtual execution—is that they are relatively static and non-adaptive. That is, a malicious person or computer program is free to try many combinations of malformed input, mapping out which input data will or will not pass through the security mechanism.

For the foregoing reasons, there exists a need for an adaptive or otherwise non-static system that prevents or discourages the tampering with information processing systems.

BRIEF SUMMARY OF THE INVENTION

The present invention is directed to a system and method to detect or prevent tampering of computer networks. In particular, the invention is directed to a system and method that alters a computer network in such a way that it becomes very difficult for an attacker to use the computer network as a means for one information processing system to attack another information processing systems. For example, the systems or methods may handle requests for network resources, such as Address Resolution Protocol (ARP) messages, and may provide fabricated information to a potential attacker to disrupt an attack on an information system.

BRIEF DESCRIPTION OF THE SEVERAL VIEWS OF THE DRAWING

FIG. 1 is a diagram illustrating lateral movement by an unauthorized user from one information processing system to another.

FIG. 2 is a diagram illustrating how ARP messages are used.

FIG. 3 is a diagram illustrating attachment of a network anti-tampering system to a network.

FIG. 4 is a diagram illustrating how a network anti-tampering system may respond to ARP messages from a potential adversary.

DETAILED DESCRIPTION OF THE INVENTION

The present invention is directed to systems and methods to detect or prevent tampering or unauthorized access of information processing systems. Information processing systems, such as personal computers or servers, can be compromised, or controlled, by unauthorized persons or programs. Once one information processing system has been compromised, it is very common for the unauthorized user or program to attempt to spread its control to other information processing systems on the same network as the compromised information processing system. Since information processing systems are most commonly connected via computer networks, the unauthorized person or program will read and write data from and to a computer network in an attempt to break into another information processing system. This modality of attack is commonly known as lateral movement.

FIG. 1 demonstrates lateral movement by an adversary from one information processing system to another. A network 100, for example, a wireless or wired local or wide area network, may comprise two or more information processing systems, such as systems 110 and 120. Information processing systems 110 and 120 may be, for example, desktops, laptops, tablets, cellular phones, internet-of-things devices, virtual machines, or any other system capable of processing information electronically. These systems are connected by links, such as links 210 and 220, to one or more switches, such as switch 310. The links may, for example, comprise a wired network connection using CAT5, CAT6, fiber optic cable, other types of network cable, or a wireless connection using Wi-Fi, Bluetooth, 3G, 4G, or LTE, or other types of wireless communications. The links may also include various permutations of wired and wireless network connections and may pass through one or more intermediate information processing systems. The switch may be a network switch designed to filter and forward packets between segments of a local area network. Optionally, systems 110 and 120 may be connected through means instead of or in addition to switch 310, such as a router, VPN, or other type of physical or virtual network connection.

For illustrative purposes and without limitation, the network 100 may use the IPV4 protocol at OSI layer 3 and the Address Resolution protocol at OSI layer 2. Other protocols, such IPV6 or PPP, may be substituted by the systems and methods described herein in similar fashion to the examples described below. In order for data to be sent through a local Ethernet network to an information processing system with an assigned IP address, the sending information processing system must first determine the local MAC address associated with the destination IP address.

FIG. 2 demonstrates an example Address Request Protocol request used in a system using the IPV4 and Address Resolution protocols. The sending system 110 learns the IP-MAC pairing by sending an ARP request message 410 across the network and listening for a reply. The ARP request message 410 will include the destination IP address that the sending system 110 wishes to access, but the destination MAC address will be unset, uninitialized, or otherwise undefined. ARP request message 410 passes through link 210 to switch 310. Switch 310 then routes the ARP message to destination system 120 through link 220. If the destination system 120 is able to receive the ARP request message, then it may respond with an ARP reply message 420. In ARP reply message 420, both the destination systems 120's IP address and system 120's MAC address are included. The ARP reply message 420 returns to sending system 110 through link 220, switch 310, and link 210. This method of identifying the low-level address of a target system is a common method information processing systems use to initiate communication through Ethernet networks.

When an unauthorized person or program tries to spread its control of one information processing system 110 to other information processing systems 120 connected via an Ethernet network, the person or program will necessarily use messages like the ARP messages described in FIG. 2 to understand what other information processing systems exist. For example, in an IPV4/ARP network, Unicast Ethernet messages can only be transmitted to a system whose MAC address is known by the sending system. If an unauthorized person or program does not reliably receive accurate information from ARP reply messages, then the unauthorized person or program will not be able to efficiently or effectively transmit data through the Ethernet network.

The proposed system and method listens for address request messages, for example ARP request messages, transmitted across a network. FIG. 3 represents such an example network 100. Network 100 may be a wireless or wired local or wide area network having two or more information processing systems 110 and 120. Information processing systems 110 and 120 may be, for example, desktops, laptops, tablets, cellular phones, internet-of-things devices, virtual machines, or any other system capable of processing information electronically. These systems are connected by links, such as links 210 and 220, to one or more switches, such as switch 310. The links may comprise a wired network connection using CAT5, CAT6, fiber optic, or other types of network cable, or a wireless connection using Wi-Fi, Bluetooth, 3G, 4G, or LTE, or other types of wireless communications. The links may also include various permutations of wired and wireless network connections and may pass through one or more intermediate information processing systems. The switch may be a network switch designed to filter and forward packets between segments of a local area network. Optionally, systems 110 and 120 may be connected through means instead of or in addition to switch 310, such as a router, VPN, or other type of physical or virtual network connection. Anti-tampering system 510 is also connected to the network via a link 230 and is connected to switch 310.

The system and method may be configured to allow anti-tampering system 510 to respond to address messages, such as if the ARP request messages, transmitted on network 100. If an ARP message is for an IP address that is not in use by any information processing systems present on network 100, the anti-tampering system 510 may be configured to respond to such messages. Anti-tampering system 510 may also be configured to monitor network traffic that passes through a specific piece of network equipment, such as switch 310, and respond to all messages for IP addresses not identified as valid for the network or any subset of the network. The anti-tampering system may also respond to requests corresponding to specific addresses where it determines that a system 110 sending an address message is not authorized to access the information system corresponding to a specific address. If the anti-tampering system 510 responds to a message, for example, an ARP request message, then the system will transmit a reply, for example an ARP reply message, that includes the IP address from the ARP request message and a fabricated MAC address that is not in use on the local Ethernet network.

FIG. 4 demonstrates an example Address Request Protocol request intercepted by anti-tampering system 510 in a system using the IPV4 and Address Resolution protocols. The sending system 110 sends an ARP request message 430 across the network. The ARP request message 430 may include a destination IP address that the sending system 110 wishes to access, but that destination IP address may correspond to a system not present on the network or a system that the sending system 110 is not authorized to access and the destination MAC address will be unset, uninitialized, or otherwise undefined. ARP request message 410 passes through link 210 to switch 310. Switch 310 then routes the ARP message to anti-tampering system 510 through link 230. Anti-tampering system 510 may then respond to request 430 with a reply, for example ARP reply message 440. In ARP reply message 440, the requested IP address is included, and a MAC address that does not correspond to an information system using requested IP address is included. The MAC address may instead correspond to anti-tampering system 510, correspond to a system configured to receive potentially unauthorized requests, or be a MAC address that does not correspond to any physical system on the network. The ARP reply message 420 returns to sending system 110 through link 230, switch 310, and link 210. The end result is that the unauthorized person or program attempting to identify resources on a network by, for example, iterating address requests through all possible addresses or a subset of possible addresses, will receive ARP reply messages indicating that unused addresses are in use on the network. This disrupts hacking activities and greatly enhances the probability of detecting unauthorized persons or programs attempting to break into other information processing systems by using the attached Ethernet network. For example, if the system detects a series of requests for non-existent MAC or IP addresses, it can determine that the requests are coming from an information processing system on the network that has been compromised. Similarly, if the system detects a predetermined number of requests for unauthorized requests, or a predetermined number of requests for MAC or IP addresses that are not present on the network, the system can flag the activity and the IP or MAC address of the requesting information processing system. The system may then take steps to remove the flagged information processing system from the network, disable its ability to communicate with selected other information processing systems on the network, or send a communication including the IP or MAC address of the flagged information processing system to network administrators or third parties.

The system and method do not require prior knowledge of the network addresses in use or the topology of the network, and do not require the network or information processing systems being protected to be reconfigured in any way. The system and method provide utility of network security and insight into network behavior.

The network anti-tampering systems and methods thus may prevent criminals from tampering with computer systems. A criminal or other unauthorized person or program will necessarily need to understand the topology of the local network in order to launch an efficient and effective attack on other information processing systems attached to the same network. The systems and methods will interfere with the criminal's attempts to understand the network topology, limiting the criminal's ability to access information on information processing systems present in the network.

The system and method may also detect misconfigured information processing systems. Sometimes an information processing system will be configured to contact network addresses not in use on the network. The invention makes obvious when an information processing system is attempting to send messages to local network addresses that are not in use, and can flag the particular information processing system as making such requests. The system may send communications to a network administrator or third party indicating the flagged information processing system, or may automatically take steps to remove the information processing system from the network or reconfigure the information processing system.

The system and method further provide visibility into which systems are communicating with each other on a particular network. This is possible because the systems and methods may listen to all address messages, for example ARP request messages at a specific network location (e.g., switch 310), and thus have a record of all communications between information processing systems on the network. The system and method may use this record of communications between information processing systems to generate patterns of normal communication within the network. If the system then detects aberrations or changes in the normal communication patters, it can provide an alert to a network administrator or third party, or automatically take action with respect to the information processing units determined to be communicating outside of the normal pattern.

The invention claimed is:

1. A system to detect and prevent network tampering comprising:
    an anti-tampering system,
    a network interface connecting the anti-tampering system to a network, and
    a software program running on the anti-tampering system, the software program containing instructions that, when executed by the anti-tampering system, cause the anti-tampering system to:
    monitor communications on the network during normal network communication;
    receive a plurality of Address Resolution Protocol (ARP) request messages from an information processing system connected to the network;
    determine whether each of the plurality of ARP request messages are for an Internet Protocol (IP) address that is in use on the network:
    identify ARP request messages directed to an IP address not in use on the network;
    for ARP request messages directed to an IP address that is in use on the network, determine whether the information processing system sending the ARP request messages is authorized to access the IP address; and
    transmit a plurality of ARP reply messages to the information processing system in response to ARP request messages identified as being directed to an IP address not in use on the system or to an IP address the information processing system is not authorized to access, wherein each reply messages comprises the IP address in the ARP request message being replied to and a Media Access Control (MAC) address that does not correspond to a network device using the IP address.

2. The system of claim 1, wherein the information processing system is a general purpose computer.

3. The system of claim 1, wherein the information processing system is a custom programmed FPGA.

4. The system of claim 1, wherein the information processing system is a custom programmed ASIC.

5. The system of claim 1, wherein the information processing system is a virtual machine running under the control of a hypervisor.

6. The system of claim 1, wherein the information processing system is a virtual machine running under the control of a hypervisor and the software program is a network device driver.

7. The system of claim 1, wherein the information processing system is a general purpose computer and the software program is a network device driver.

8. The system of claim 1, wherein the MAC address is the MAC address of the anti-tampering system, a MAC address of a device on the network that is configured to receive unauthorized requests, or a MAC address that does not correspond to any physical device on the network.

9. The system of claim 1, wherein the software program executed by the anti-tampering system is further configured to, in response to determining that the information processing system ARP request messages are directed to an IP address not in use on the network or an IP address the information processing system is not authorized to access:
- removing the information processing system from the network;
- disabling the information processing system's ability to communicate with selected other information processing systems on the network; or
- sending a communication including the IP or MAC address of the information processing system to one or more third parties.

10. The system of claim 1, wherein the software program executed by the anti-tampering system is further configured to flag the IP address of, MAC address of, or network activity of the information processing system as compromised.

11. A method to detect and prevent network tampering over a network connected to an anti-tampering system through a network interface comprising:
- monitoring, with the anti-tampering system, communications on the network during normal network communication;
- receiving, with the anti-tampering system, an Address Resolution Protocol (ARP) request message from an information processing system connected to the network;
- determine whether the ARP request message is for an Internet Protocol (IP) address that is in use on the network or that is not in use on the network, and, if the message is directed to an IP address that is in use on the network, further determining whether the information processing system is authorized to access the IP address;
- transmitting, with the anti-tampering system, an ARP reply message to the information processing system in response to determining that the ARP request message is directed to an IP address not in use on the system or to an IP address the information processing system is not authorized to access, wherein the reply comprises the IP address in the ARP message request being replied to and a Media Access Control (MAC) address that does not correspond to a network device using the IP address.

12. The method of claim 11, wherein the information processing system is a general purpose computer.

13. The method of claim 11, wherein the information processing system is a general purpose computer and the software program is a network device driver.

14. The method of claim 11, wherein the MAC address is the MAC address of the anti-tampering system, a MAC address of a device on the network that is configured to receive unauthorized requests, or a MAC address that does not correspond to any physical device on the network.

15. The method of claim 11, further comprising, in response to determining that the information processing system ARP request message is directed to an IP address not in use on the network or an IP address the information processing system is not authorized to access:
- removing the information processing system from the network;
- disabling the information processing system's ability to communicate with selected other information processing systems on the network; or
- sending a communication including the IP or MAC address of the information processing system to one or more third parties.

16. The method of claim 11, wherein the method further comprises flagging, with the anti-tampering system, the IP address of, MAC address of, or network activity of the information processing system as compromised.

* * * * *